US010745994B2

(12) United States Patent
Valera et al.

(10) Patent No.: US 10,745,994 B2
(45) Date of Patent: Aug. 18, 2020

(54) SYSTEM AND METHOD FOR PREVENTING INADVERTENT VALVE CLOSURES

(71) Applicant: GE Oil & Gas Pressure Control LP, Houston, TX (US)

(72) Inventors: Lauren Michelle Valera, Houston, TX (US); Travis McEvoy, Houston, TX (US); Keith Adams, Houston, TX (US)

(73) Assignee: GE OIL & GAS PRESSURE CONTROL LP, Houston, TX (US)

( * ) Notice: Subject to any disclaimer, the term of this patent is extended or adjusted under 35 U.S.C. 154(b) by 190 days.

(21) Appl. No.: 15/961,580

(22) Filed: Apr. 24, 2018

(65) Prior Publication Data
US 2019/0323318 A1  Oct. 24, 2019

(51) Int. Cl.
*E21B 34/00* (2006.01)
*F16K 37/00* (2006.01)

(52) U.S. Cl.
CPC .......... *E21B 34/00* (2013.01); *F16K 37/0041* (2013.01)

(58) Field of Classification Search
CPC .... E21B 34/10; E21B 2034/005; E21B 34/00; E21B 34/063; E21B 47/011; E21B 47/09; E21B 47/10; F16K 37/0008; F16K 37/0041; F16K 37/0033
See application file for complete search history.

(56) References Cited

U.S. PATENT DOCUMENTS

| 2,015,542 | A | | 9/1935 | Zeiss |
| 3,719,203 | A | * | 3/1973 | Wettre ................ F16K 37/0033 137/554 |
| 3,789,875 | A | | 2/1974 | McGee |
| 4,406,303 | A | | 9/1983 | Kilmoyer |
| 4,718,487 | A | | 1/1988 | Lanmon, II |
| 4,749,043 | A | | 6/1988 | Rodenberger |
| 4,886,115 | A | | 12/1989 | Leggett et al. |
| 5,597,042 | A | | 1/1997 | Tubel et al. |
| 6,427,576 | B1 | * | 8/2002 | Bock ................... F15B 15/2807 92/5 R |

(Continued)

OTHER PUBLICATIONS

"Subsurface Safety Systems," https://www.bakerhughes.com/products-and-services/completions/well-completions/subsurface-safety-systems, 2017, 11 pages.

(Continued)

*Primary Examiner* — Daniel P Stephenson
(74) *Attorney, Agent, or Firm* — Hogan Lovells US LLP

(57) ABSTRACT

Embodiments of the present disclosure include a system for determining a valve member position. The system includes a valve having a flow passage extending therethrough. The system also includes a valve member positioned in a cavity that intersects the flow passage, the valve member coupled to a valve stem that axially translates the valve member between an open position and a closed position. The system includes an actuator coupled to the valve stem, the actuator providing a motive force to drive the axial movement of the valve member via the valve stem. The system includes a closure cap coupled to the actuator, the closure cap comprising a sensor feature arranged within an interior portion of the closure cap, the sensor feature arranged to react to an input from an actuator piston indicative of an actuator piston position within the interior portion of the closure cap.

20 Claims, 7 Drawing Sheets

(56) References Cited

U.S. PATENT DOCUMENTS

| | | | | |
|---|---|---|---|---|
| 6,820,647 | B1* | 11/2004 | Grecco | F16K 31/041 |
| | | | | 137/137 |
| 8,395,374 | B2 | 3/2013 | Newman | |
| 9,103,459 | B2* | 8/2015 | Borchgrevink | F16K 37/0008 |
| 9,428,994 | B2* | 8/2016 | Landrith, II | E21B 34/16 |
| 9,822,603 | B2* | 11/2017 | Whitby | E21B 33/064 |
| 10,140,843 | B2* | 11/2018 | Jordan | G08B 25/10 |
| 2004/0078117 | A1 | 4/2004 | Vanderah | |
| 2008/0040070 | A1* | 2/2008 | McClanahan | E21B 33/062 |
| | | | | 702/158 |
| 2011/0278291 | A1 | 11/2011 | Taylor | |
| 2012/0000646 | A1* | 1/2012 | Liotta | E21B 33/062 |
| | | | | 166/85.4 |
| 2014/0076571 | A1 | 3/2014 | Frazier | |
| 2017/0022778 | A1 | 1/2017 | Fripp | |
| 2017/0102088 | A1 | 4/2017 | Cheng | |
| 2017/0191338 | A1 | 7/2017 | Whitby | |
| 2019/0323318 | A1* | 10/2019 | Valera | F16K 37/0041 |

OTHER PUBLICATIONS

International Search Report and Written Opinion dated Jul. 17, 2019 in corresponding PCT Application No. PCT/US19/28466.

\* cited by examiner

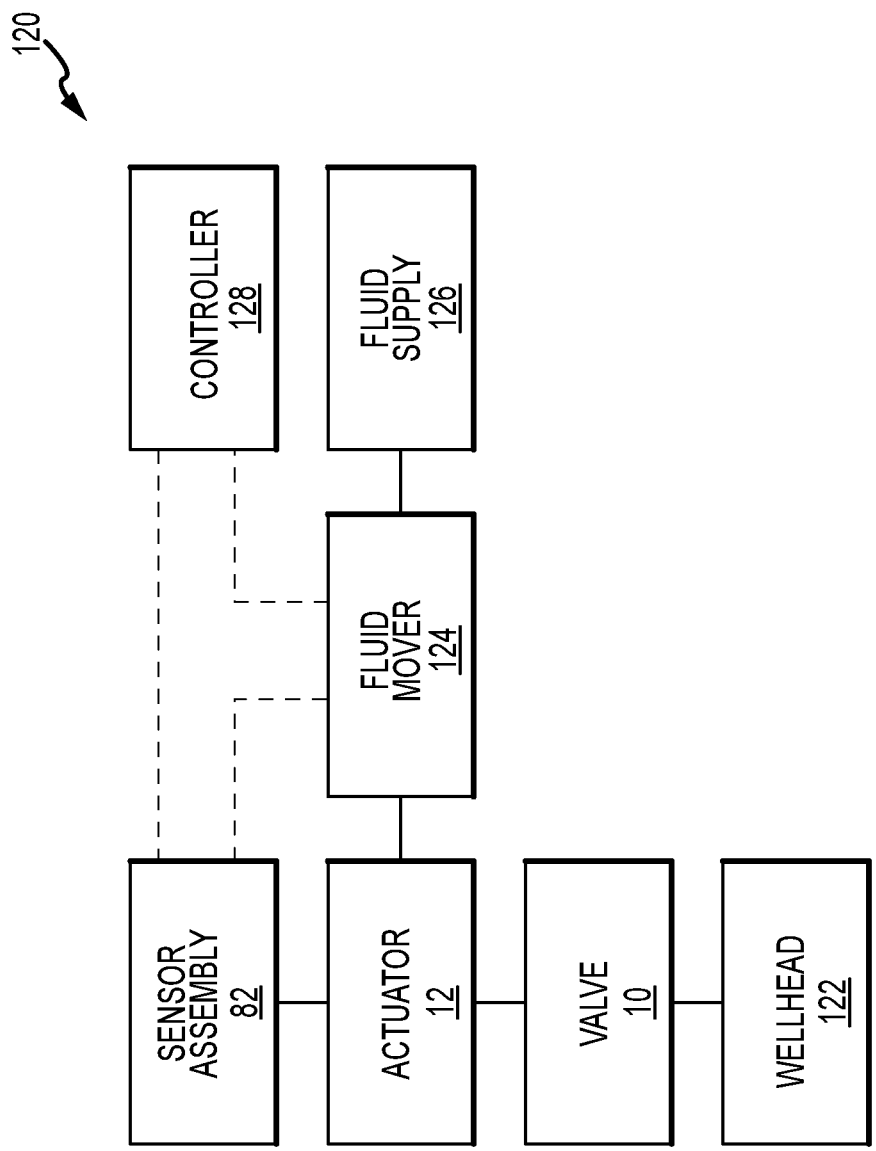

SYSTEM AND METHOD FOR PREVENTING INADVERTENT VALVE CLOSURES

BACKGROUND

1. Field of the Invention

The present disclosure relates in general to downhole wellbore operations and more particularly to flow control devices used in downhole wellbore operations.

2. Description of Related Art

During downhole drilling and recovery operations, various tools may be tripped into and out of a wellbore to perform a number of different tasks. Wellbores may include wellbore assemblies at the surface that include one or more valves to regulate flow into and out of the wellbore. As such, the tools that are installed into the wellbore travel through a flow port of these valves. Various wellbore operations may utilize a conveyance technique known as wireline, which uses a cabling technology to lower equipment into the wellbore. Wireline provides the advantage of data and power transmission into the wellbore through the wireline cable, which may be more reliable than other transmission methods. However, a typical wireline cable may be generally small in diameter, and therefore susceptible to damage. For example, one or more valves may be moved to a closed position when the wireline cable extends through the flow port. The closing of the valve may shear the wireline cable and the tool coupled to the wireline cable may be dropped into the wellbore. When tools are lost due to the wireline cable shearing, wellbore operations are stopped in order to recover the tools, which increases time and costs associated with downhole recovery.

SUMMARY

Applicants recognized the problems noted above herein and conceived and developed embodiments of systems and methods, according to the present disclosure, for flow control systems.

In an embodiment a system for determining a valve member position includes a valve having a flow passage extending therethrough, the flow passage positioned at least partially within a cavity formed in a valve body. The system also includes a valve member positioned in the cavity, the valve member coupled to a valve stem that axially translates the valve member between an open position and a closed position, the open position corresponding to a position where a passage formed in the valve member substantially aligns with the flow passage and a closed position corresponding to a position where a block of the valve member substantially aligns with the flow passage. The system further includes an actuator coupled to the valve stem, the actuator providing a motive force to drive the axial movement of the valve member via the valve stem. The system also includes a closure cap coupled to the actuator, the closure cap comprising a sensor feature arranged within an interior portion of the closure cap, the sensor feature arranged to react to an input from an actuator piston indicative of an actuator piston position within the interior portion of the closure cap.

In another embodiment a system for determining a valve member position includes a body portion, the body portion defining an interior portion. The system also includes a sensor assembly positioned to detect an actuator position. The system further includes an indicator arranged on the body portion and outside of the interior portion, the indicator receiving a signal from the sensor assembly when the sensor assembly detects the actuator position within a predetermined distance of the sensor assembly.

In an embodiment, a method for detecting a valve member position includes installing a sensor assembly proximate an actuator, the actuator being coupled to a valve and driving movement of a valve member between an open position and a closed position. The method further includes determining the valve member position relative to an actuator piston position. The method also includes obtaining the actuator piston position from the sensor assembly. The method further includes determining if the actuator piston position is above a predetermined threshold. The method includes transmitting an alert when the actuator piston position is above the predetermined threshold.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 6 is a block diagram of an embodiment of a well site system, in accordance with embodiments of the present disclosure.

DETAILED DESCRIPTION

Figure 1:
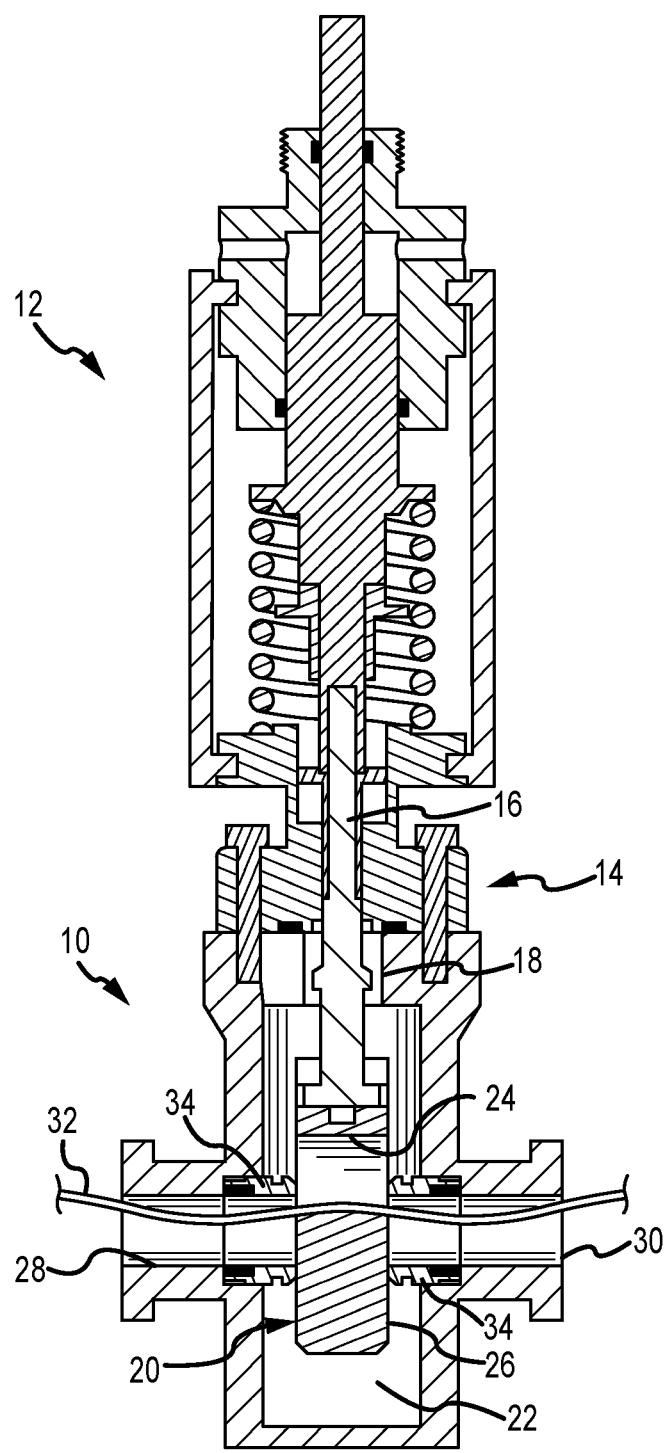
FIG. 1 is a schematic cross-sectional view of an embodiment of a valve having an actuator, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include systems and methods for alerting an operator as to a position of a valve member via detection of an actuator piston position. In various embodiments, a closure cap is installed onto an actuator housing that includes a sensor assembly (e.g., sensor feature) that detects a position of the actuator piston. The actuator piston position is correlated to the valve member position, and as a result, by detecting the actuator piston position the valve member position may be known. In various embodiments, the sensor assembly is arranged with a gap between the actuator piston and the sensor assembly, thereby enabling a predetermined amount of movement before the sensor assembly alerts the operator about the closure of the valve. Further, in various embodiments, the sensor assembly is arranged very close to the actuator position such that even minor movements are detected. The sensor assembly may include a switch or the like that detects a proximity of the actuator piston and/or direct contact with the actuator piston. Additionally, in various embodiments, the closure cap includes an indicator, such as a visual indicator, to alert the operator about movement of the actuator piston. In various embodiments, the closure cap may include a transmission protocol, such as a wireless transmission protocol, in order to transmit a signal to a controller, which may stop operation of the actuator to reduce the likelihood of damage to the wireline cable.

FIG. 1 is a cross-sectional side elevation view of an embodiment of a valve 10 that includes an actuator 12 coupled to a bonnet 14. The illustrated actuator 12 is coupled to a valve stem 16 that extends through a central bore 18 and couples to a valve member 20 arranged within a chamber 22. The illustrated valve member 20 includes a passage 24 and a block 26. As shown, fluid (e.g., gas, liquid, solid, or a combination thereof) may enter the valve 10 through an inlet passage 28 and engage the valve member 20 en route to an outlet passage 30. In the illustrated embodiment, the valve member 20 is transitioning between an open position, in which the passage 24 is substantially aligned with the inlet passage 28 and the outlet passage 30, and a closed position, in which the block 26 is substantially aligned with the inlet passage 28 and the outlet passage 30.

In the illustrated embodiment, a wireline cable 32 extends through the valve 10 and into the passage 24. However, it will be appreciated that as the actuator 12 moves the valve member 20 toward the closed position, the wireline cable 32 will impinge against the valve seats 34, and may be damaged or sheared by the force supplied to the valve member 20 by the actuator 12. As a result, tools coupled to the wireline cable 32 may be dropped down the wellbore and/or the wireline cable 32 may be damaged which may sever a data or power connection to the tool.

In various embodiments, once the actuator 12 begins moving the valve member 20 between the open and closed positions it may be challenging for an operator to identify the position of the valve or stop the valve. Typical operations may include numerous valves with a variety of personnel on site asking operators to open or close valves for a variety of applications. As such, the operator may be instructed to close a particular valve and inadvertently damage the wireline cable 32. Furthermore, the operator may be unaware of which valve is being operated by looking at the valve alone because the valve stem 16 may be shrouded, for example within the actuator 12), thereby eliminating a visual indication to the operator as to the position of the valve. Furthermore, mechanical stops arranged to block movement of the valves may be cumbersome to install and still provide no indication to the operator regarding the position of the valve. Accordingly, systems and methods of the present disclosure are directed toward devices to block inadvertent valve closures, which may damage wirelines 32, while also providing an indication to the operator as to which valve is inadvertently moving toward a closed position.

Figure 2:
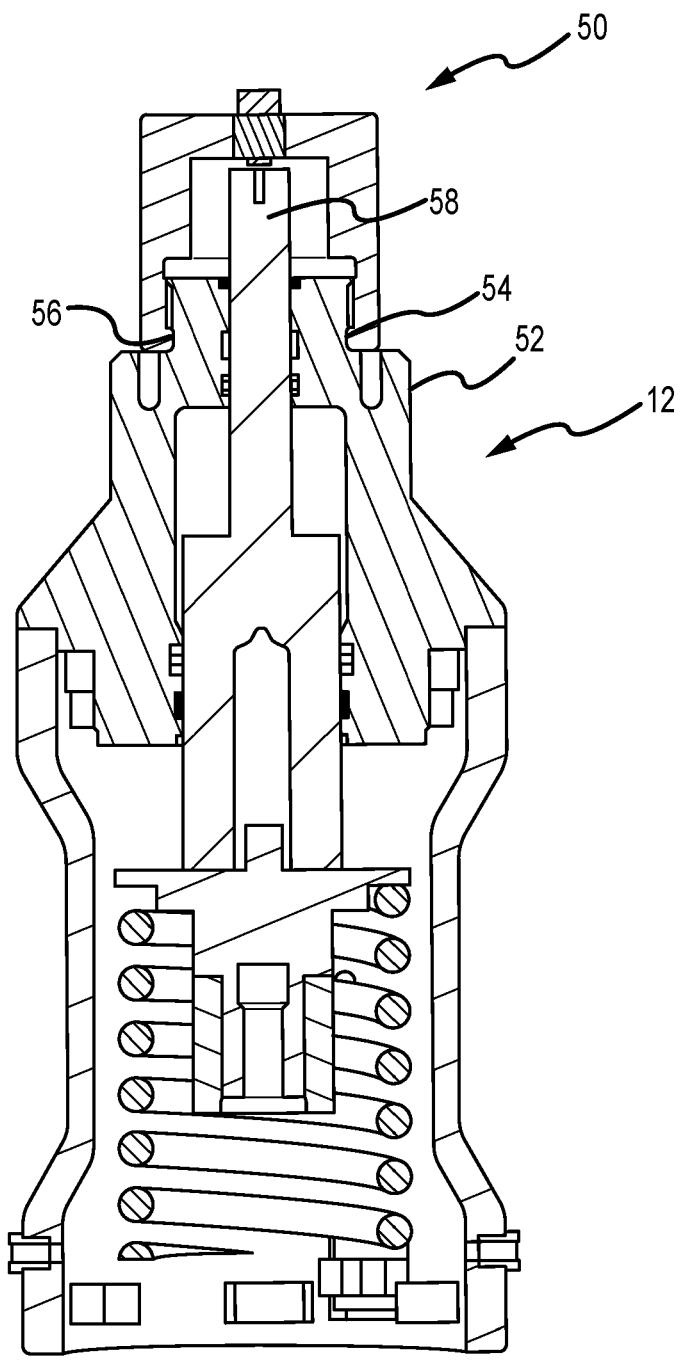
FIG. 2 is a schematic cross-sectional view of an embodiment of a valve and actuator including a closure cap, in accordance with embodiments of the present disclosure.

FIG. 2 is a schematic cross-sectional side elevational view of an embodiment of a closure cap 50 arranged on the actuator 12. In the illustrated embodiment, the closure cap 50 is threaded onto an actuator housing 52 via threads 54 that engage mating threads 56 arranged on the actuator housing 52. However, it should be appreciated that in other embodiments different mechanisms may be utilized to secure the closure cap 50 to the actuator housing 52, such as bolts, pins, clamps, and the like. Accordingly, the coupling mechanism of the closure cap 50 may be particularly selected for each application, thereby enabling retrofitting and installation to a variety of actuator housings 52 that may already be in service. As such, the cost associated with installing and updating existing units in the field may be decreased due to the variety of coupling mechanisms that may be integrated into the closure cap 50.

As will be described in detail below, the closure cap 50 may include one or more mechanisms in order to determine a position of the valve member 20 based on a relative position of an actuator piston 58. That is, the actuator piston 20 may couple to the valve stem 16 to transmit a force from the actuator 12 (which may be a hydraulic force, a pneumatic force, or any other type of force) to the valve stem 16 and drive movement of the valve member 20. It should be appreciated that a position of the actuator piston 58 may be correlated to a position of the valve member 20. As such, detecting the actuator piston 58 position may correlate to detection of the valve member 20 position.

Figure 3A:
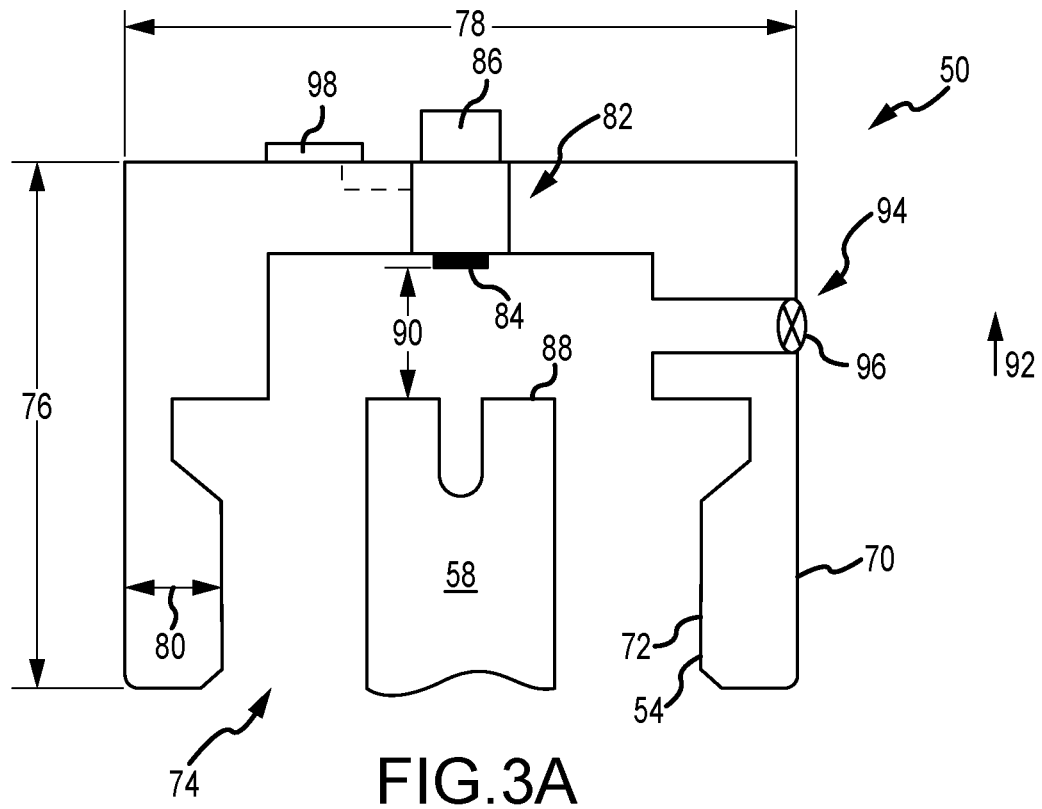
FIG. 3A is a schematic cross-sectional side view of an embodiment of a closure cap including a sensor assembly, in accordance with embodiments of the present disclosure.

FIG. 3A is a schematic cross-sectional side view of an embodiment of the closure cap 50 arranged on the actuator housing 52. In the illustrated embodiment, the closure cap 50 includes a body portion 70 with the threads 54 arranged on an interior surface 72. As described above, in other embodiments the closure cap 50 may include apertures for bolts or pins, as well as clamps or other types of closure mechanisms to facilitate coupling to the actuator housing 52.

The closure cap 50 further includes an interior portion 74 that is substantially hollow or open, thereby enabling passage of the actuator piston 58 through the interior portion 74. It should be appreciated that the dimensions of the closure cap 50, such as a height 76, a width 78, and a thickness 80 may be particularly selected based on the application.

In various embodiments, the closure cap 50 includes a sensor assembly 82 (e.g., sensor feature) disposed within the body portion 70. The illustrated sensor assembly 82 includes a switch or relay 84 that transmits a signal to an indicator 86, which in the illustrated embodiment is a visual indicator, which may be a light. It should be appreciated that the indicator 86 is not limited to a visual indicator and that in various embodiments the indicator 86 may include the visual indicator, auditory indicator, haptic indicator, other types of indicators, and any combination thereof. In operation, as the actuator piston 58 activates the switch 84, a signal is transmitted to the indicator 86, which may activate a light that illuminates to indicate to the operator that the valve member 20 is moving toward the closed position. Furthermore, it should be appreciated that, in various embodiments, the sensor assembly 82 may also transmit a signal to a control system to stop operation of the actuator 12, which will be described below.

In the illustrated embodiment, a top 88 of the actuator position is positioned within the interior portion 74 of the closure cap 50 and arranged a distance 90 from the switch 84. In other words, the distance 90 forms a gap between the top 88 and the switch 84. As such, a predetermined amount of movement may be a condition for activating the switch 84. In various embodiments, the distance 90 may be very small such that even minor movements may activate the switch 84. In other embodiments, the distance 90 may be predetermined based on an anticipated diameter of the wireline cable 32, such that the valve 10 may be partially closed without shearing the wireline cable 32.

Figure 3B:
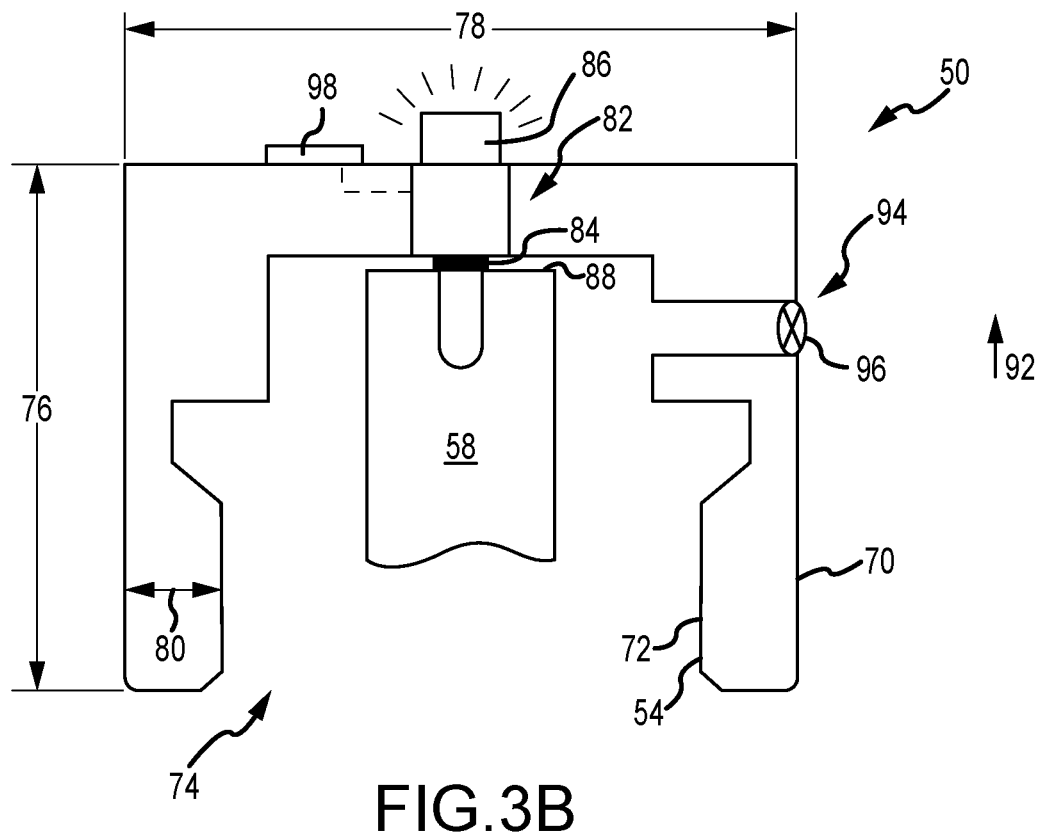
FIG. 3B is a schematic cross-sectional side view of an embodiment of a closure cap including a sensor assembly, in accordance with embodiments of the present disclosure.

FIG. 3B is a schematic side elevational view of an embodiment of the closure cap 50. In the illustrated embodiment, the sensor assembly 82 is activated by the actuator piston 58 such that the indicator 86 is activated. The illustrated indicator 86 is a light and that light may turn on or flash to provide a visual indication to the operator that the valve member 20 is being moved toward a closed position. In various embodiments, the switch 84 may be arranged within the interior portion 74 such that the switch 84 is activated before the valve member 20 is fully closed, thereby alerting the operator of the movement before the wireline cable 32 is damaged. For example, the switch 84 may be positioned such that the actuator piston 58 touches the switch 84 prior to fully closing the valve 10. For example, embodiments may include frangible or otherwise destructible closure caps 50 that at least partially delay full closing of the valve 10. In other words, the actuator piston 58 may contact the switch 84 and continue to move in an upward direction 92 and through the body portion 70 before the valve member 20 is fully in the closed position. Additionally, in embodiments, the sensor assembly 82 may include a position sensor that detects the actuator piston 58 when the actuator piston 58 is within a predetermined proximity of the switch 84. For example, the sensor assembly 82 and/or switch 84 may function as a magnetic sensor that detects a magnetic field from the actuator piston 58 and/or a magnet embedded within the actuator piston 58. In this manner, the operator may be alerted to a closing of the valve 10.

FIGS. 3A and 3B further illustrates a vent 94 formed through the body portion 70 to the interior portion 74. In the illustrated embodiment, the vent 94 includes a restriction 96, such as a one way valve, to facilitate removal of air within the body portion 70. In operation, if air or other materials collect within the body portion 70 while the actuator piston 58 is moving in the upward direction 92, vapor lock may occur to block the movement. This may be undesirable in embodiments where closure of the valve 10 is the desired outcome. Accordingly, the vent 94 may be utilized to release air or other material from the interior portion 74. It should be appreciated that the vent 94 may be incorporated into any of the embodiments illustrated herein. Additionally, in various embodiments one or more power supplies 98 may be utilized with the embodiment described here. For example, the power supply 98 may include a battery or a connection to a power source at the well site. Additionally, in embodiments, renewable energy sources, such as solar cells, may be integrated into the closure cap 50 to provide power to the sensor assembly 82 and/or the indicator 86. By utilizing solar cells, the number of wires or cables run along the well site may be decreased. Furthermore, a reduction in maintenance may be realized by using solar cells because operations will not monitor and replace batteries or power cables.

Figure 4A:
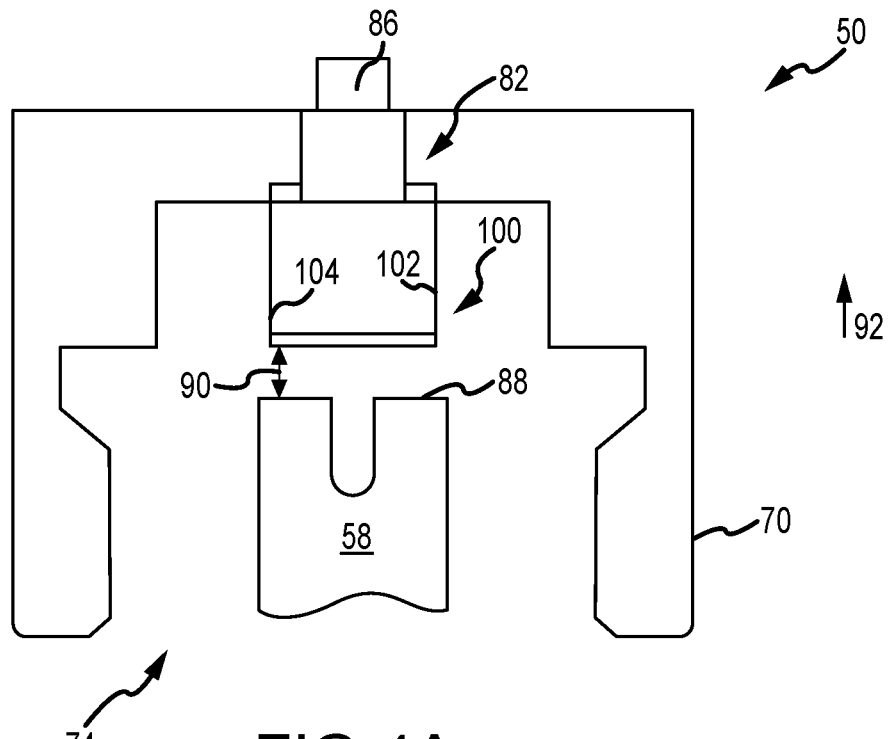
FIG. 4A is a schematic cross-sectional side view of an embodiment of a closure cap including a sensor assembly, in accordance with embodiments of the present disclosure.

FIG. 4A is a schematic cross-sectional side view of an embodiment of the closure cap 50 including the sensor assembly 82 comprising a piezoelectric sensor 100. In the illustrated embodiment, the sensor 100 is coupled to the sensor assembly 82 and includes lead wires 102, 104 for transmitting a signal to the sensor assembly 82 indicative of a flexing or force being applied to the sensor 100. In various embodiments, the top 88 of the actuator piston 56 is arranged the distance 90 from the sensor 100, thereby enabling a predetermined amount of movement. However, it should be appreciated that the distance 90 may be substantially zero in this or any embodiment such that any movement, even minor movements activate the sensor assembly 82. As described above, in the illustrated embodiment the sensor assembly 82 is coupled to the indicator 86, which may be a visual indicator such as a light, to provide an alert to the operator regarding the valve 10 closing.

Figure 4B:
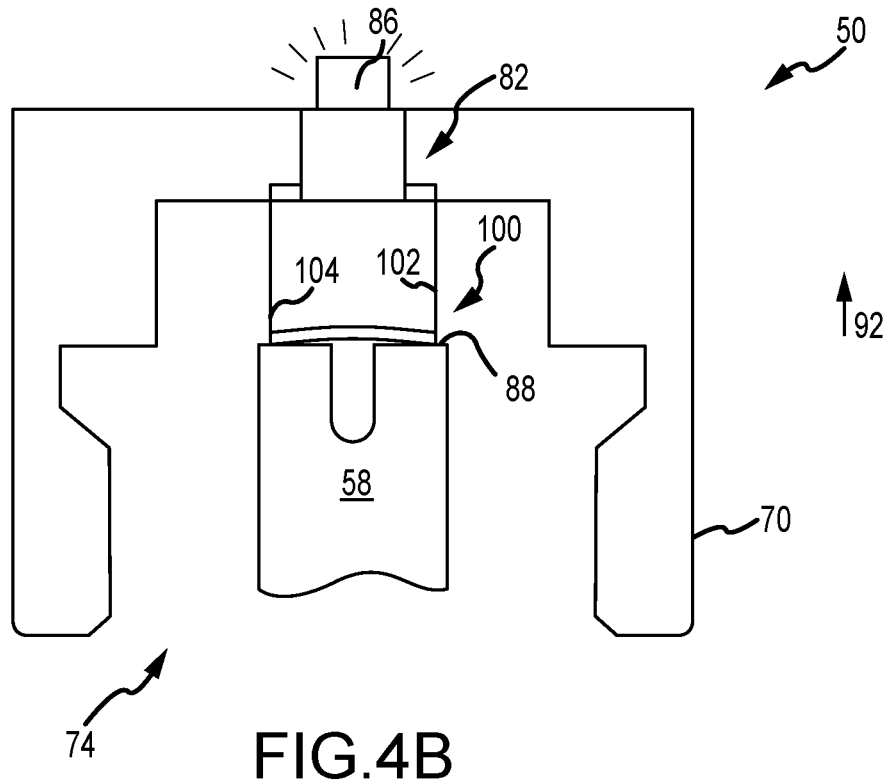
FIG. 4B is a schematic cross-sectional side view of an embodiment of a closure cap including a sensor assembly, in accordance with embodiments of the present disclosure.

FIG. 4B is a schematic cross-sectional side view of an embodiment of the closure cap 50 in which the sensor 100 is activated by the actuator piston 58. It should be appreciated that the bending and/or flexion of the sensor 100 may be exaggerated in the illustrated embodiment. As described above, as the actuator 12 moves the valve member 20 into the closed position the actuator piston 58 may move in the upward direction 92, toward the sensor 100. As the top 88 contacts the sensor 100, the bending may be received by the sensor assembly 82, for example via the lead wires 102, 104, to register the change in strain over the sensor 100. Accordingly, the indicator 86 may receive a signal to activate, thereby providing a notification to the operator that the valve is moving toward the closed position.

Figure 5A:
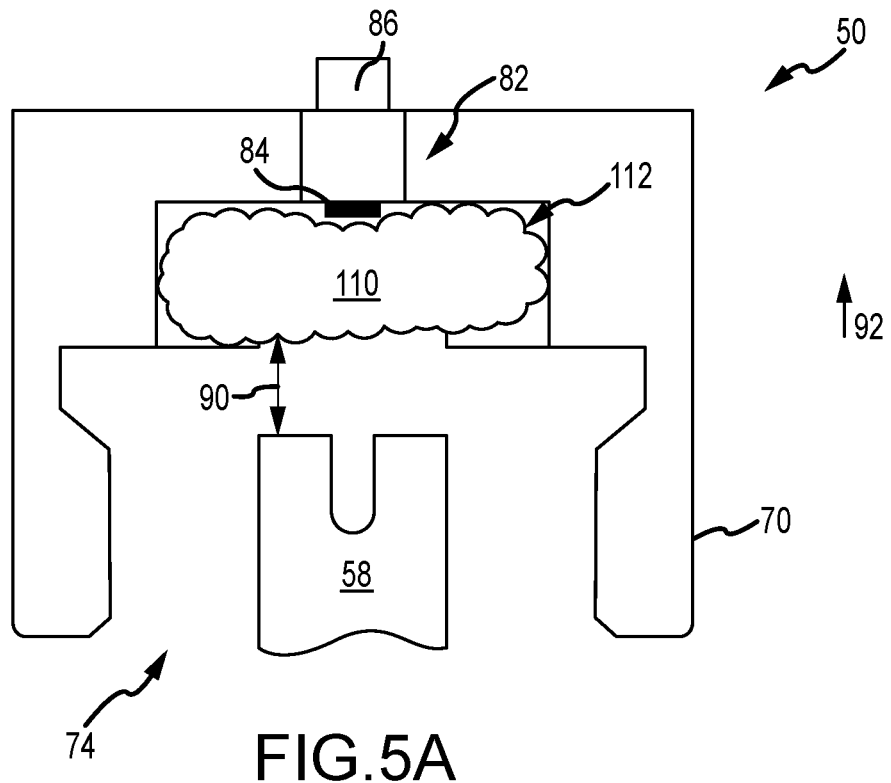
FIG. 5A is a schematic cross-sectional side view of an embodiment of a closure cap including a sensor assembly, in accordance with embodiments of the present disclosure.

FIG. 5A is a schematic cross-sectional side view of an embodiment of the closure cap 50 that includes the sensor assembly 82 and a dampening material 110 arranged within a cavity 112 of the closure cap 50. In the illustrated embodiment, the top 88 of the actuator piston 58 is arranged the distance 90 from the cavity 112 and the dampening material 110, thereby forming a gap to provide some movement before activation of the sensor assembly 82. However, as described above, in various embodiments the distance 90 may be any length and may be small enough that even minor movement (e.g., fractions of an inch) of the actuator piston 58 activate the sensor assembly 82. The illustrated dampening material 110 is used to slow the upward movement of the actuator piston 58, thereby providing additional time for the operator to notice the closure of the valve 10. In various embodiments, the dampening material 110 may be positioned within the cavity 112 such that a force from the actuator piston 58 acting on the dampening material 110 activates the switch 84, before the actuator piston 58 reaches the switch 84, thereby providing an early warning system regarding closure of the valve 10.

Figure 5B:
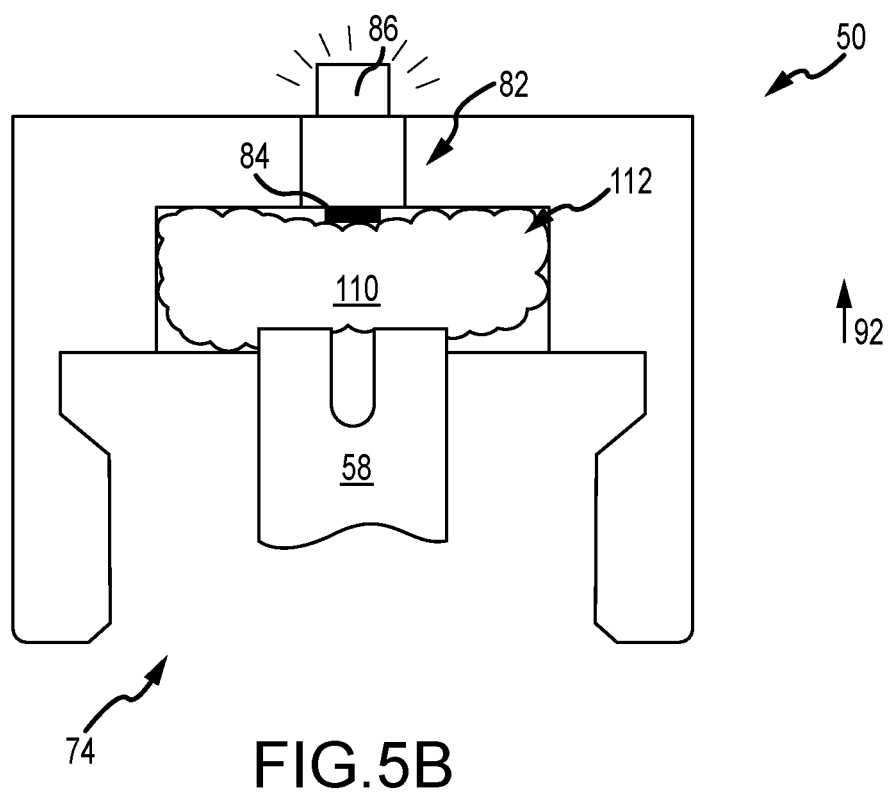
FIG. 5B is a schematic cross-sectional side view of an embodiment of a closure cap including a sensor assembly, in accordance with embodiments of the present disclosure.

FIG. 5B is a schematic cross-sectional side view of an embodiment of the closure cap 50 wherein the actuator piston 58 has moved in the upward direction 92 into the cavity 112. As shown, the indicator 86 is activated by the dampening material 110 before the actuator piston 58 reaches the switch 84. As a result, the operator may be informed of the closure before the wireline cable 32 is damaged. It should be appreciated that various types of materials may be utilized as the dampening material 110, such as a polystyrene expandable foam or any other reasonable material (e.g., plastics, rubber, sealants, etc.).

In various embodiments, one or more components of the closure cap 50 may be formed from a material that melts or otherwise degrades at high temperatures, such as in the event of a fire. Accordingly, the degradation of the one or more components may facilitate closure of the valve 10, thereby blocking fluid flow into or out of the wellbore. In various embodiments, as described above, the sensor assembly 82 may be arranged to enable a predetermined amount of movement or to detect even slight movement of the actuator piston 58. As will be appreciated, in certain embodiments operations may know that the wireline cable 32 will be extending through the valve 10, and therefore the closure cap 50 may be installed as operations begin to detect slight movement of the actuator piston 58, thereby reducing the likelihood of inadvertent closure. However, in various embodiments, some movement may be tolerated, for example to adjust various flow rates during operation, and as a result the predetermined movement, facilitated by the distance 90, may be incorporated into embodiments of the present disclosure in order to monitor the position of the valve member 20 over a certain distance.

FIG. 6 is a schematic block diagram of an embodiment of a well site system 120 that may be utilized to control operation of the actuator 12. In the illustrated embodiment, the valve 10 is coupled to a wellhead 122, which may include one or more components utilized in downhole operations and may be coupled to a wellbore. The valve 10 is operationally coupled to the actuator 12, which may drive movement of the valve member 20 between an open position and a closed position, as described above. The actuator 12 may also include the sensor assembly 82, via a connection to the closure cap 50.

In various embodiments, the actuator 12 may be hydraulically driven. A fluid mover 124, such as a pump, is coupled to a fluid source 126 to supply the fluid to the actuator 12, which drives movement of the valve member 20. In various embodiments, a controller 128 (which may include one or more processors, memory, and programs stored on that memory to execute instructions via the one or more processors) manages operation of the fluid mover 124, such as turning the fluid mover 124 on/off, regulating a flow rate, and the like. In the illustrated embodiment, the sensor assembly 82 may be communicatively coupled to the fluid mover 124 and the controller 128.

In various embodiments, the sensor assembly 82 may receive an indication that the top 88 of the actuator piston 58 is near the switch 84 and/or the sensor 100 and may transmit a signal to the controller 128 and/or the fluid mover 124 indicative of closure of the valve 10. Transmission may be facilitated by a wired connection or by a wireless communication protocol. In various embodiments, if closure of the valve is undesirable, the signal may include an instruction to stop operation of the fluid mover 124, thereby stopping further closure of the valve 10. For example, the controller 128 may include logic that enables the operator to specify that the wireline cable 32 is currently extending through the valve 10. As a result, upon receipt of the signal from the sensor assembly 82, the controller 128 may send a signal to the fluid mover 124 instructing the fluid mover 124 to shut off. In this manner, the system may automatically stop closure of the valve 10 without operator interaction.

Figure 7:
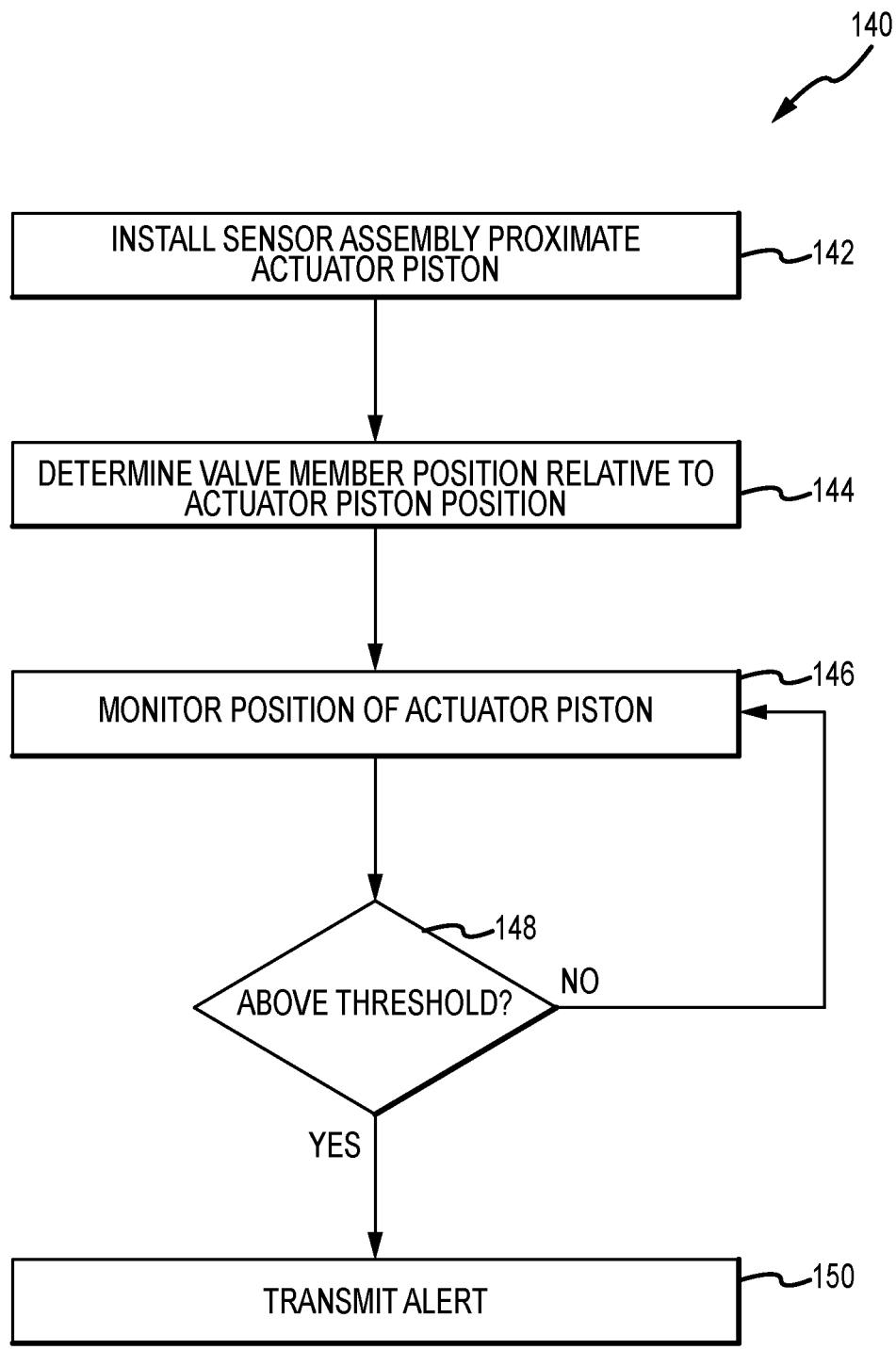
FIG. 7 is a flow chart of an embodiment of a method for detecting a valve member position, in accordance with embodiments of the present disclosure.

FIG. 7 is a flow chart of an embodiment of a method 140 for detecting a valve member position. As described in detail above, in various embodiments the sensor assembly 82 may be installed within the closure cap 50 on the actuator 12 to determine the position of the actuator piston 58, which may be correlated to the valve member position. In various embodiments, the sensor assembly 82 is installed proximate the actuator piston 58 (block 142). For example, the closure cap 50 may be coupled to the actuator housing 52 via the threads 54, 56. Next, the position of the valve member 20 relative to the actuator piston 58 may be determined (block 144). As described above, in various embodiments the distance between the actuator piston 58 and the valve member 20 is fixed, and as a result, the position of the valve member 20 can be determined based on the position of the actuator piston 58. For example, the actuator piston 58 at a top position or at the top of a stroke may correlate to the valve member 20 in the closed position.

In various embodiments, the position of the actuator piston 58 is monitored (block 146). For example, the controller 128 may receive periodic signals from the sensor assembly 82 indicative of the valve member 20 position. Furthermore, in various embodiments, monitoring may include waiting to receive a signal from the sensor assembly 82, which may be configured to transmit a signal when the actuator piston 58 is within a predetermined distance to the sensor assembly 82. Further, in various embodiments, the signal may be transmitted when the actuator piston 58 contacts or otherwise activates the sensor assembly 82. Thereafter, the position of the actuator piston 58 may be evaluated against a threshold (operator 148). In various embodiments, the threshold may be whether the actuator piston 58 is within a predetermined distance. Additionally, in embodiments, the threshold may be whether the sensor assembly 82 is activated, for example by making contact with the switch 84. If the actuator piston 58 is not above the threshold, then the monitoring may continue. If the actuator piston 58 is above the threshold, then an alert may be transmitted (block 150). The alert may be a visual alert, such as one provided by the indicator 86. In various embodiments, the alert may correspond to a signal transmitted to the fluid mover 124 and/or the controller 128. In certain embodiments, the alert transmitted to the fluid mover 124 and/or the controller 128 may stop operation of the actuator 12, such as by stopping operation of the fluid mover 124. In this manner, inadvertent closure of the valve 10 may be monitored and avoided to reduce the likelihood of damage to the wireline cable 32.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for determining a valve member position, the system comprising:
   a valve having a flow passage extending therethrough, the flow passage positioned at least partially within a cavity formed in a valve body;
   a valve member positioned in the cavity, the valve member coupled to a valve stem that axially translates the valve member between an open position and a closed position, the open position corresponding to a position where a passage formed in the valve member substantially aligns with the flow passage and a closed position corresponding to a position where a block of the valve member substantially aligns with the flow passage;
   an actuator coupled to the valve stem, the actuator providing a motive force to drive the axial movement of the valve member via the valve stem; and
   a closure cap directly coupled to the actuator to enclose at least a portion of an actuator piston, the closure cap comprising a sensor feature arranged within an interior portion of the closure cap, the sensor feature arranged to react to an input from an actuator piston indicative of an actuator piston position within the interior portion of the closure cap.

2. The system of claim 1, further comprising:
   an indicator formed on the closure cap, the indicator receiving a signal from the sensor feature when the sensor feature detects the actuator piston.

3. The system of claim 2, wherein the indicator comprises a visual indicator, an auditory indicator, a haptic indicator, or a combination thereof.

4. The system of claim 1, further comprising:
   a fluid mover coupled to the actuator to direct a working fluid into the actuator to drive movement of the actuator piston;
   a fluid source coupled to the fluid mover supplying the working fluid to the fluid mover; and
   a control system communicatively coupled to the fluid mover, the control system adjusting operation of the fluid mover.

5. The system of claim 4, wherein the sensor feature transmits a signal to the control system indicative of the valve member position.

6. The system of claim 1, wherein the sensor feature comprises a position switch, a magnetic sensor, a piezoelectric sensor, or a combination thereof.

7. The system of claim 1, wherein the closure cap is formed from a frangible material that degrades due to a force applied on the closure cap by the actuator piston.

8. The system of claim 1, further comprising:
   a cavity formed in the closure cap; and
   a dampening material positioned within the cavity, wherein the dampening material activates the sensor feature when acted on by the actuator piston and at least partially blocks upward movement of the actuator assembly toward the sensor feature.

9. A system for determining a valve member position, the system comprising:
   a body portion, the body portion defining an interior portion;
   a sensor assembly positioned to detect an actuator position, the sensor assembly being coaxial with an axis of an actuator; and
   an indicator arranged on the body portion and outside of the interior portion, the indicator receiving a signal from the sensor assembly when the sensor assembly detects the actuator position within a predetermined distance of the sensor assembly.

10. The system of claim 9, wherein the sensor assembly is arranged within the interior portion, further comprising:
    a cavity positioned adjacent the sensor assembly; and
    a dampening material positioned within the cavity, wherein the dampening material activates the sensor assembly when acted on by the actuator piston and at least partially blocks upward movement of the actuator assembly toward the sensor assembly.

11. The system of claim 9, wherein the sensor assembly comprises a switch, a position sensor, a magnetic sensor, a piezoelectric sensor, or a combination thereof.

12. The system of claim 9, wherein at least a portion of the body portion is formed from a frangible material that dampens movement of the actuator piston.

13. The system of claim 9, wherein at least a portion of the body portion is formed from a heat sensitive material that degrades when exposed to temperatures above a predetermined threshold.

14. The system of claim 9, further comprising:
    a power source arranged on the body portion, the power source providing electrical power to at least one of the sensor assembly or the indicator.

15. The system of claim 14, wherein the power source comprises a battery, a solar cell, or a connection to an external power supply.

16. The system of claim 9, wherein the indicator comprises a visual indicator, an auditory indicator, or a combination thereof.

17. A method for detecting a valve member position, the method comprising:
    installing a sensor assembly proximate an actuator, the actuator being coupled to a valve and driving movement of a valve member between an open position and a closed position;
    determining the valve member position relative to an actuator piston position;
    obtaining the actuator piston position from the sensor assembly;
    determining if the actuator piston position is above a predetermined threshold; and
    transmitting an alert when the actuator piston position is above the predetermined threshold.

18. The method of claim 17, further comprising:
    transmitting a signal to a controller when the actuator piston position is above the predetermined threshold; and
    stopping a fluid mover providing a motive fluid to the actuator.

19. The method of claim 17, wherein transmitting the alert comprises transmitting a signal to an indicator located proximate the actuator, the indicator providing a visual or auditory alarm.

20. The method of claim 17, further comprising:
    installing the sensor assembly within a closure cap; and
    coupling the closure cap to an actuator housing.

* * * * *